United States Patent [19]

Baba et al.

[11] 4,433,403

[45] Feb. 21, 1984

[54] OPTICAL DISC RECORDING AND RETRIEVAL SYSTEM

[75] Inventors: Sueki Baba, Osaka; Tomio Yoshida, Katano; Nobuo Akahira, Yawata; Tadaoki Yamashita, Hirakata, all of Japan

[73] Assignee: Matsushita Electric Industrial Co., Ltd., Osaka, Japan

[21] Appl. No.: 254,274

[22] Filed: Apr. 15, 1981

[30] Foreign Application Priority Data

Apr. 15, 1980 [JP] Japan .................................. 55-49717

[51] Int. Cl.$^3$ ...................... G11B 27/22; G11B 27/30
[52] U.S. Cl. ..................................... 369/48; 369/111; 369/124
[58] Field of Search ................... 369/44, 61, 62, 100, 369/102, 109, 111, 128, 275, 124, 54, 58, 59, 30, 32, 47, 48, 49; 358/330, 323, 322, 311, 335, 342, 314, 336; 365/127; 360/20, 21; 371/12, 13

[56] References Cited

U.S. PATENT DOCUMENTS

| | | | |
|---|---|---|---|
| 3,657,707 | 4/1972 | McFarland et al. | 365/127 |
| 4,145,758 | 3/1979 | Drexler et al. | 369/44 |
| 4,313,191 | 1/1982 | Winslow et al. | 369/275 |
| 4,327,430 | 4/1982 | Wada et al. | 369/111 X |
| 4,340,907 | 7/1982 | Hirata et al. | 369/47 X |

FOREIGN PATENT DOCUMENTS 19924  12/1980  European Pat. Off. ............. 369/54

Primary Examiner—Bernard Konick
Assistant Examiner—Donald McElheny, Jr.
Attorney, Agent, or Firm—Wenderoth, Lind & Ponack

[57] ABSTRACT

An optical signal recording and reproduction or retrieval system which records a primary signal on a recording track provided on a recording medium by projecting a laser beam which has been modulated by the primary signal onto the recording track, and further records a secondary signal, by superposition, on the recording track by projecting the laser beam which has been modulated by the secondary signal having a frequency band which is different from that of the primary signal onto the recording track for enabling the deleting of the previously recorded primary signal.

5 Claims, 14 Drawing Figures

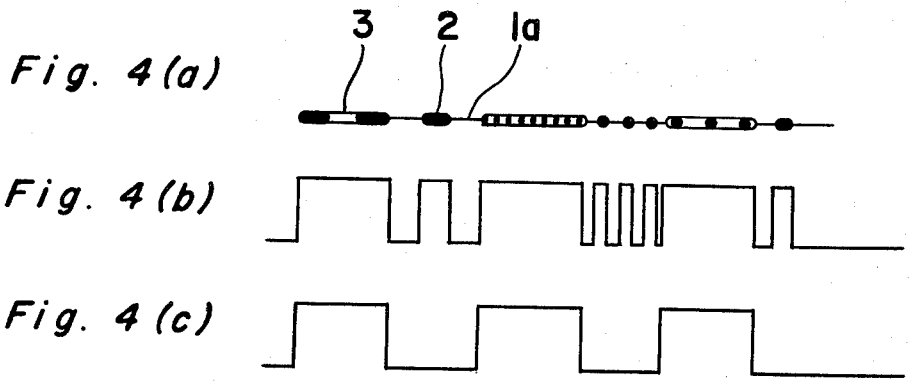
Fig. 4(a)
Fig. 4(b)
Fig. 4(c)
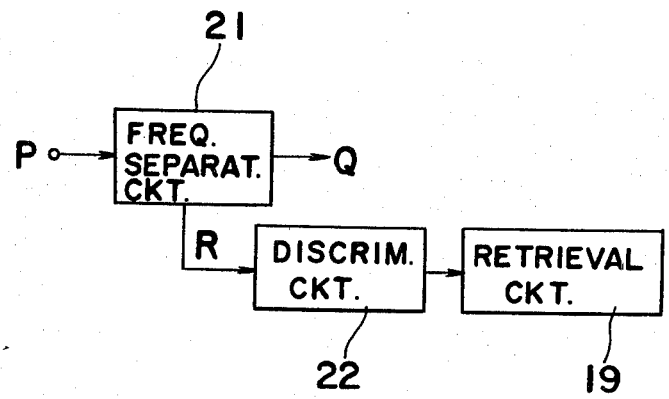
Fig. 5

OPTICAL DISC RECORDING AND RETRIEVAL SYSTEM

BACKGROUND OF THE INVENTION

The present invention generally relates to a recording and reproduction or retrieval system, and more particularly, to an optical signal recording and reproduction system for selective recording or reproduction of signals on a recording medium through the utilization of a laser beam.

Recently, there have been introduced, for actual applications, optical signal recording and reproduction systems enabling recording and reproduction or retrieval of video and acoustic signals to be effected with the use of laser beams, and although some of such recording and reproduction systems proposed are arranged to employ recording mediums which are composed of materials capable of erasing the recorded signals when required, most of them are not provided with functions for erasing the signals once they are recorded.

Incidentally, the optical signal recording and reproduction systems as described above are characterized in that a large capacity of information signals may be recorded therein, and are capable of accumulating information contained within papers having as many as 15,000 sheets, when such systems are applied, for example, to the filing of documents. In a case where the large capacity of information as described above is accumulated, there often arises the necessity for deleting particular portions of tracks containing, for example, information which has become useless, confidential information, etc. Meanwhile, when the large amounts of information as stated above are accommodated, one of the requirements is that the selected information should be quickly searched for reading, and in such cases, if it is so arranged that the useless tracks which are deleted as above are rapidly identified as deleted tracks based on predetermined signals for jumping or skipping over such portions during the searching, the selected information may be conveniently read more quickly for efficient operation.

However, since most of the conventional optical signal recording and reproduction systems currently in use are incapable of erasing the previously recorded signals, they can not fully meet the requirements as described above.

SUMMARY OF THE INVENTION

Accordingly, an essential object of the present invention is to provide an improved optical signal recording and reproduction or retrieval system by which unwanted or useless recorded signals can be deleted in an efficient manner.

Another important object of the present invention is to provide an improved optical signal recording and reproduction system as described above in which portions of a recording medium from which the recorded signals are deleted, may be effectively utilized as a second signal recording track.

In accomplishing these and other objects, according to one preferred embodiment of the present invention, there is provided an optical signal recording and reproduction system which includes the steps of recording a primary signal on a recording track provided on a recording medium by projecting thereonto a laser beam modulated by the primary signal, further recording, by superposition, a secondary signal onto the recording track by projecting thereto the laser beam modulated by the secondary signal having frequency band different from that of the primary signal, and extracting the secondary signal, by separation, from a reproduction signal during the reproduction thereof.

By the arrangement of the present invention as described above, an improved optical signal recording and reproduction system has been presented, with substantial elimination of disadvantages inherent in the conventional signal recording and reproduction systems of this kind.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 4(a) to 4(c) are schematic diagrams showing the relationship between the state of the optical signal recording thin film and a reproduction output signal, and also a secondary reproduction output signal;

FIG. 5 is an electrical block diagram showing the main portion of a reproducing arrangement which is employed in the optical signal recording and reproduction system according to the present invention;

Before the description of the present invention proceeds, it is to be noted that like parts are designated by like reference numerals throughout several views of the accompanying drawings.

DETAILED DESCRIPTION OF THE INVENTION

Figure 1:
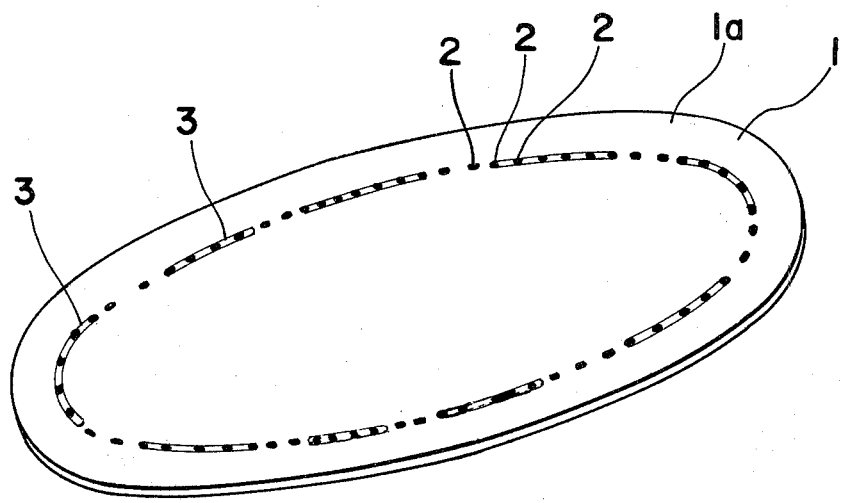
FIG. 1 is a perspective view of a disc-shaped recording medium which may be employed in an optical signal recording and reproduction or retrieval system according to the present invention, and which schematically shows the state of recording of signals thereon.

Referring now to the drawings, there is shown in FIG. 1 a disc-shaped recording medium 1 (referred to as a recording disc hereinbelow) on which a fresh signal is superposed over a recording track already subjected to recording by the optical signal recording and reproduction system according to the present invention.

In FIG. 1, the recording disc 1 has, on its surface, a thin layer or film 1a of an optical recording medium capable of recording signals by a light beam, for example, laser beam, and a first or primary signal 2 written or recorded on a circular track thereon is shown by black dots, while a second or secondary signal 3 written or recorded for addition onto the same track as for the primary signal 2, is denoted by blank or white dots for schematic representation. The primary signal 2 and secondary signal 3 may be recorded either under the same optical condition or under a condition somewhat different from each other, although it is essential anyhow that the information of the secondary signal 3 is readable or retrievable. It is to be noted that, in FIG. 1, bit lengths of the signals 2 and 3, i.e., the frequencies thereof, are shown to be altered, and that, by differentiating the frequency bands in the above described manner, the secondary signal 3 may be detected. In the above embodiment, the reproduction of the primary signal 2 becomes somewhat difficult, but the sacrifice of said primary signal 2 may present no particular problem, if the primary signal is regarded as one to be deleted. Similarly, although the secondary signal 3 may be lowered in its quality as compared with the case where the signal is initially written in the recording disc 1 which has not been subjected to recording, a sufficient reproduction capacity is still available, if the recording is limited simple code signals, etc., so as to thereby to fully effect various controls and the like.

Subsequently, the construction of the recording disc 1 will be described in detail hereinbelow.

Figure 2:
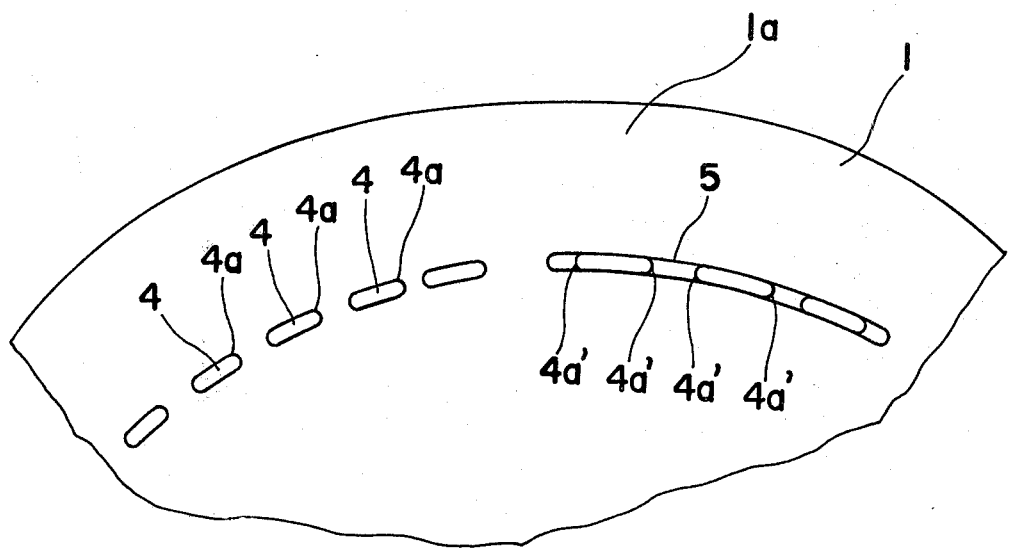
FIG. 2 is a fragmentary perspective view showing, on an enlarged scale, the state of signal bits on an optical signal recording thin film of the recording medium of FIG. 1.

For the thin film 1a for the optical recording, there are such kinds that particular portions of the thin film subjected to the projection of the laser beam are either evaporated or fused into holes by the heat of the laser beam. The former kind includes chalcogen compound thin films, organic thin films containing pigments, etc., while the latter kind includes Bi thin films, chalcogen compound thin films and the like. FIG. 2 shows the state of bits when the thin films as described above are employed.

In the case where the evaporating thin film is employed as one example for the recording disc, although the central portion of each bit 4 subjected to be projection of the laser beam is completely evaporated, the portion therearound is not evaporated into holes, but is subjected to chemical change to a certain extent, and tends to form, in may cases, portions 4a as subjected to burning or scorching. In the above state, when the writing of the secondary signal is subsequently effected thereon, the above portions 4a in the burned or scorched state are not evaporated, but remain to some extent, within secondary recording bits 5 as shown at 4a', which give rise to noise in the reproduction of the secondary signal. Similarly, the same phenomenon as described above takes place also in the case of the thin film which is arranged to be fused into holes, because the fused thin film material moves to the peripheral portion of the hole to form slightly raised portions around the bits. As described above, since the secondary signal is accompanied by some noise to a certain extent at all times, it is necessary that the wavelength of the secondary signal should be set so as to be more than three times as long as that of the primary signal.

For another example of the optical recording medium which can be recorded by the light beams, there are substances only whose optical reflectance or transmittance is varied, without giving any geometrical unevenness to the optical recording thin film, and which may be represented by low oxide thin films of Te, part of chalcogen compound thin films, etc. When these substances are employed for the optical recording medium, the noise factor may be reduced, since the change around the bits as described earlier does not take place. However, noise factors from such aspects that the secondary signal is deviated from the track for the primary signal, are further added, and upon consideration of such factors, it is required that the frequency of the primary signal and that of the secondary signal be altered in the ratio thereof by more than 1.5 times.

Hereinbelow, the method of recording and reproducing the signals on the recording disc as stated above will be generally described.

Figure 3:
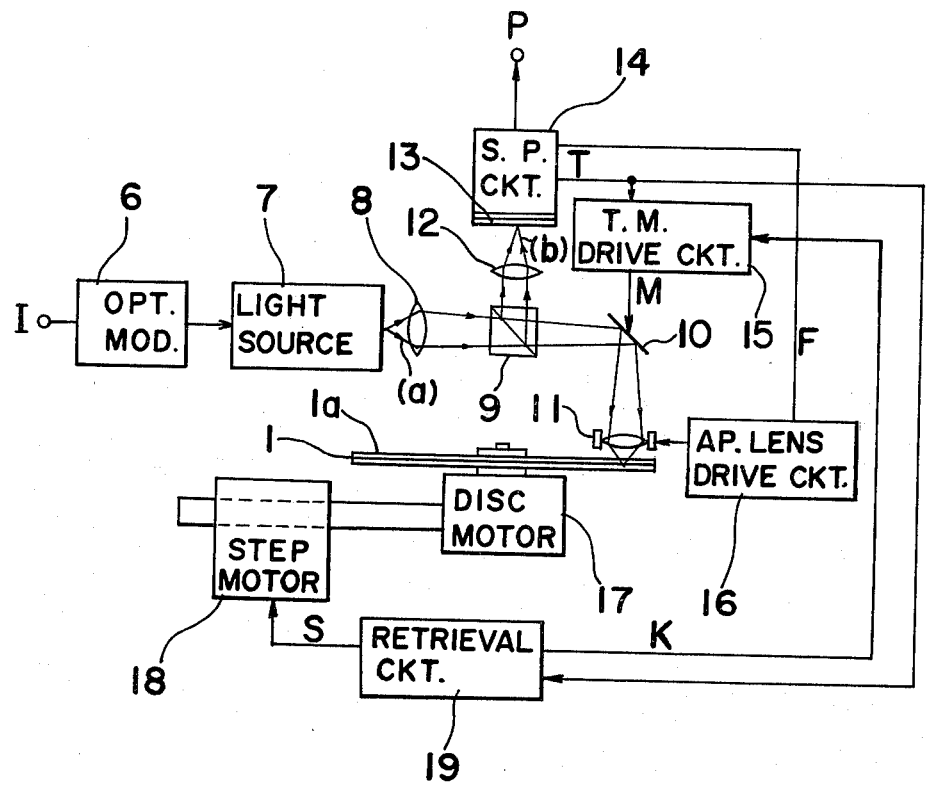
FIG. 3 is an electrical block diagram showing one example of a conventional optical signal recording and reproduction apparatus to which the recording and reproducting system according to the present invention may be applied.

Referring to a electrical block diagram of FIG. 3 showing one example of a conventional optical type signal recording and reproduction apparatus, in a first recording, video signal and the like to be recorded is applied from an input terminal I into an optical modulator 6, as a result of which a laser light (a) varying in its intensity is emitted from a laser light source 7 which is connected to the optical modulator 6 according to the variation of the video signal. The laser light (a) thus produced is passed through a condenser lens 8 to be collected, and the light thus collected is projected onto the surface of a recording layer 1a on a recording disc 1 which is rotated by a disc motor 17, through a polarized beam splitter 9, a tracking mirror 10 and an aperture lens 11 which are sequentially disposed between the laser light source 7 and the recording disc 1 as shown. On the surface of the recording layer 1a of the recording disc 1, bits for the primary signal 2 as shown in FIG. 1 are recorded as the variation of reflectance according to the magnitude of the laser light (a). The laser light (b) reflected by the disc surface 1a is again passed through the aperture lens 11 and tracking mirror 10 so as to be separated from the path for the light (a) by the beam splitter 9, and then, projected through a light detection lens 12 onto a light detector 13 which is coupled to a signal processing circuit 14. It is to be noted here that, if the known astigmatism system is employed for the focus control, a cylindrical lens may be employed for the light detection lens 12, with a four division light detector being adopted for the light detector 13. Based on the signal from the light detector 13, a tracking control signal T and a focus control signal F are produced at the signal processing circuit 14, and the tracking control signal T is fed to a tracking mirror driving circuit 15 coupled to the signal processing circuit 14 for controlling the functioning of the tracking mirror 10 by means of a mirror driving signal M emitted from the tracking mirror driving circuit 15. Meanwhile, the focus control signal F is forwarded to an aperture lens driving circuit 16 which is also coupled to the signal processing circuit 14 so as to effect the focus control of the aperture lens 12. The retrieval of the recorded track is effected by producing a step motor driving signal S and a mirror retrieval signal K from a retrieval circuit 19 which is coupled to the signal processing circuit 14, the tracking mirror driving circuit 15 and also to a step motor 18 for controlling the functionings of the step motor 18 and the tracking mirror 10 so as to move the laser beam approximately in the radial direction.

For the reproduction or retrieval of the recorded signals, the laser light (a) should be without modulation, and be of such a degree in its intensity as will not cause any appreciable change in the recording film. The laser light (a) reaches the disc surface 1a through exactly the same path as in the recording so as to be reflected thereat. The reflected laser light (b) which is varied in its intensity by the variation of the reflectance of the recorded bits on the disc surface 1a, reaches the light detector 13 through the same path as in the recording mode, and is output is the reproduction or retrieval signal P at the signal processing circuit 14. It is to be noted that the tracking, focusing and retrieval are effected in the same manner as in the recording, although the detail description thereof is abbreviated here for brevity.

The optical signal recording and reproduction system according to the present invention may be applied to the conventional optical signal recording and reproduction apparatus, for example, to the one as described in the foregoing with reference to FIG. 3 in a manner as described hereinbelow.

For effecting the secondary recording according to the present invention, it may be performed in the similar manner as in the primary recording by applying the secondary recording signal to the light modulator 6 in the circuit arrangement of FIG. 3. Meanwhile, in the reproduction, by separating the reproduction signal P produced in the circuit of FIG. 3 with a conventional frequency separator, the secondary signal may be utilized for various controls, etc.

Reference is made to FIGS. 4(a) to 4(c) showing a general concept for the relationships between the state of the recording thin film illustrated in FIG. 1 and reproduction output signal, and also the secondary output signal.

In FIG. 4(a), there is shown the thin film layer including the unchanged portions 1a, bit portions 2 (black spots) formed by the primary signal, other bit portions 3 (white spots) resulting from the secondary recording. In FIG. 4(b) showing the reproduction output signal (the output P in FIG. 3) obtained by reproduction of the recording track shown in FIG. 4(a), it is noticed that the primary signal and secondary signal are simutaneously present. Meanwhile, in FIG. 4(c), the waveform of the secondary signal separated from said reproduction signal by a known frequency separating circuit (FIG. 5) is shown.

Subsequently, examples for applications of the secondary signal as described above will be described hereinbelow.

In the case where portions which are not preferable for reproduction, i.e. portions desired to be deleted, come to be present in the recorded track on the recording disc 1, a secondary signal having a predetermined frequency band different from that of the primary signal, is recorded onto said portions.

For reproduction, the reproduction output P is applied to the frequency separating circuit 21 which is coupled to the retrieval circuit 19 through a discriminating circuit 22 for separation thereof into the primary signal Q and the secondary signal R.

The secondary signal R thus separated is applied to the subsequent discriminating circuit 22 for causing a drive control circuit (not shown here) to function by the discriminating output of said circuit 22 so as to effect the predetermined functionings such as cutting off of the reproduction output, and the rapid advancing of the recorded track by a predetermined number.

On the assumption that the recording disc 1 is rotated at a speed of 1800 r.p.m., with the secondary signal being recorded at a frequency of 100 KHz, the secondary signal is detected at a $10^{-4}$ to $10^{-5}$ second period, which is at an extremely high speed as compared with the time of 1/30 second due to the scanning by one round of the track, and, in the practical application, the effect similar to the disappearance of the track recorded with the secondary signal, may be achieved.

In the foregoing embodiment, since the wavelength of the secondary signal is set to be longer than that of the primary signal, it becomes impossible to reproduce only the primary signal; but, by making the wavelength of the secondary signal shorter than that of the primary signal, it is possible to take out the primary signal, through separation thereof, from the track in which the primary and secondary signals are simultaneously present.

Figure 6:
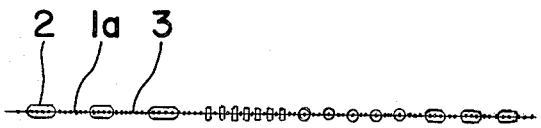
FIGS. 6(a) to 6(e) are schematic diagrams explanatory of the relationship between the state of the optical signal recording thin film and that of the reproduction signals with reference to the arrangement of FIG. 5.
Figure 6:
Figure 6:
Figure 6:
Figure 6:

Referring to FIGS. 6(a) to 6(e) showing diagrams representing a general concept of the above arrangement, FIG. 6(a) shows the state of the thin film layer including the unchanged portions 1a, bit portions 2 representing changed portions by the primary signal of a high frequency band, and small dot portions 3 where the secondary signal is recorded. Upon reproduction thereof by the reproduction apparatus as described with reference to FIG. 3, the reproduction signal as shown in FIG. 6(b) is developed at the reproduction output P, and upon the separation thereof by the known frequency separating circuit, the secondary recorded signal is separated as shown in FIG. 6(c), while the primary recorded signal is also separated as shown in FIG. 6(d). It is seen from the above that the original primary signal shown in FIG. 6(e) is almost perfectly reproduced, whereby it becomes possible to effect the control of the primary signal with the use of the secondary signal.

Figure 7:
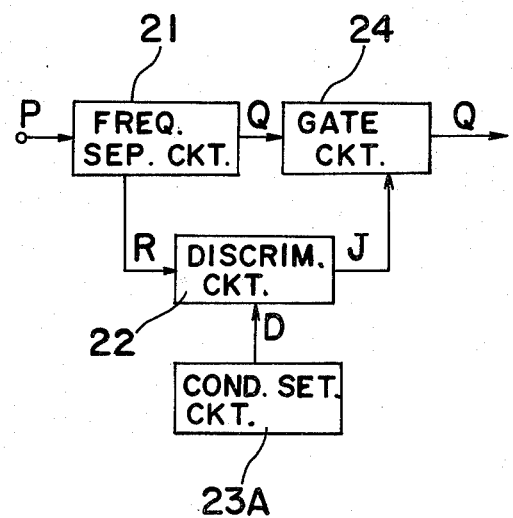
FIG. 7 is a diagram similar to FIG. 5, which particularly shows a modification thereof.

Referring now to FIG. 7, there is shown a block diagram of one example for application of the above arrangement for keeping the contents of the primary signal confidential, in which the signal discriminating circuit 22 connected to the frequency separating circuit 21 is further coupled to a gate circuit 24 and the driving control circuit 23A, with the frequency separating circuit 21 also connected to the gate circuit 24.

In the arrangement of FIG. 7, the secondary output R obtained by separating the reproduction output P in FIG. 3 by the frequency separating circuit 21, and conditional signal D preliminarily set during the reproduction from the condition setting circuit 23A are decoded by the signal discriminating circuit 22, and if the conditions have been satisfied, approval signal J is fed to the gate circuit 24 for developing the separation signal Q of the primary signal. The selection of recording wavelengths of the secondary signal may depend on the purposes of the applications, but from the viewpoint of the recording power, those of long wavelengths result in low cost with respect to the apparatus, since they require only low powers.

On the other hand, in the case where a plurality of continuous tracks within the disc surface become unnecessary, considerable time may be wasted, if the retrieval thereof is effected for each track. In such a case, it is possible to effect apparent erasure of the unnecessary portions by recording DC signals as the secondary signal in the track at the beginning and end portions of the unnecessary portions and causing the track to be rapidly fed for that section through the utilization of the signal to be produced when the light travels approximately radially.

Figure 8:
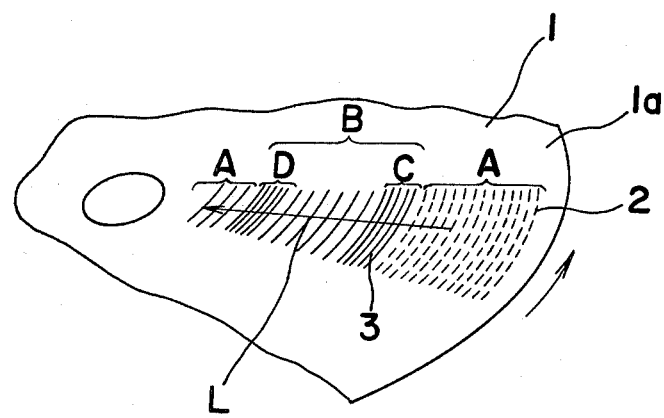
FIG. 8 is a view similar to FIG. 2, which particularly shows a modification thereof.
Figure 9:
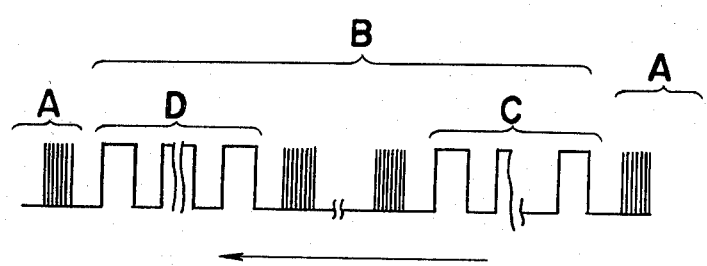
FIG. 9 is a diagram explanatory of the state of reproduction signal produced by the arrangement of FIG. 8.

Reference is made to FIG. 8 schematically showing the distribution of the recording tracks on the disc surface, and also to FIG. 9 showing a diagram explanatory of the functionings thereof.

In FIG. 8, the thin film 1a of the recording disc 1 includes the primary signal 2 written thereon, secondary signal tracks 3 in which DC signals are recorded at opposite end portions of the unnecessary track section B in the necessary tracks A. On the assumption that the recording pitch is 3 μm in the case where scanning is effected as shown in a light path L by the laser beam at a speed of 250 mm/sec., a reproduction output of approximately 100 KHz is developed at the starting portion C and ending portion D as shown in FIG. 9. The reproduction output P thus obtained is decoded by the circuit as shown in FIG. 5 so as to control the scanning by the laser beam.

In the above arrangement, since the recording light is of direct current, not only the circuit construction is simplified, but high speed scanning is advantageously effected especially when a large area is to be erased.

As is clear from the foregoing description, according to the present invention, substantial erasing of the recorded signal is possible even in the recording medium normally incapable of being erased, while the concept of the present invention may be applied in various ways as stated earlier.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A signal recording and retrieval system comprising:
   a means for recording a primary signal on a recording track provided on a recording medium by projecting thereonto a laser beam which has been modulated by said primary signal;
   a means for further recording a secondary signal, by superposition, onto a section of said recording track having a previously recorded primary signal which is to be deleted, by projecting said laser beam thereonto, said laser beam being modulated by said secondary signal and said secondary signal having a frequency band which is different from a frequency band of said primary signal;
   a means for retrieving a signal including said primary signal from said recording track;
   a means for extracting said secondary signal from said retrieved signal during the retrieval thereof;
   and a means for inhibiting an outputting of said retrieved primary signal by controlling a gate means provided in a transmission path of said retrieval signal during these periods of time when a separated secondary signal is present in said retrieved signal.

2. A signal recording and retrieval system as claimed in claim 1, wherein said secondary signal has frequency which is higher than said frequency band of said primary signal.

3. A signal recording and retrieval system as claimed in claim 1, wherein said secondary signal has frequency which is lower than said frequency band of said primary signal and and wherein said secondary signal is recorded over an entire width of said recording track.

4. A signal recording and retrieval system comprising:
   a means for recording a primary signal on a recording track provided on a recording medium by projecting thereonto a laser beam which has been modulated by said primary signal;
   a means for further recording a secondary signal, by superposition, in a vicinity of a forward end and a terminal end of a section of said recording track having a previously recorded primary signal which is to be deleted, by projecting said laser beam thereonto, said laser beam being modulated by said secondary signal and said secondary signal having a frequency band which is different from a frequency band of said primary signal;
   a means for retrieving a signal including said primary signal from said recording track;
   a means for extracting said secondary signal from said retrieved signal during the retrieval thereof;
   and a means for effecting a fast feeding retrieval operation, whereby said primary signal is skipped at a high speed and thereby not outputted from the retrieval system, during a time period from an initial detection of said retrieved secondary signal to a subsequent detection of said retrieved secondary signal.

5. A signal recording and retrieval system as claimed in claim 4, wherein said secondary signal comprises a D.C. signal.

* * * * *